United States Patent [19]

Shoda

[11] Patent Number: 5,046,233
[45] Date of Patent: Sep. 10, 1991

[54] MACHINE TOOL

[76] Inventor: Isao Shoda, 116-4, Okaba-cho, Hamamatsu-shi, Shizuoka-ken, Japan

[21] Appl. No.: 556,146

[22] Filed: Jul. 23, 1990

[30] Foreign Application Priority Data

Oct. 2, 1989 [JP] Japan ................................. 1-257286

[51] Int. Cl.[5] ............................................. B23Q 3/157
[52] U.S. Cl. ....................................................... 29/568
[58] Field of Search ................... 29/568, 26 A, 33 P, 29/563; 408/42, 46; 414/728, 729

[56] References Cited

U.S. PATENT DOCUMENTS

| 3,667,114 | 6/1972 | Smith et al. | 29/568 |
| 4,110,897 | 9/1978 | Hipwell et al. | 29/568 |
| 4,528,742 | 7/1985 | Peacock | 29/568 |
| 4,642,875 | 2/1987 | Rütschle et al. | 29/568 |
| 4,675,977 | 6/1987 | Kölblin et al. | 29/568 |
| 4,701,994 | 10/1987 | Noh et al. | 29/568 |
| 4,729,159 | 3/1988 | Henneberg et al. | 29/568 |

FOREIGN PATENT DOCUMENTS

59-33281  8/1984  Japan .

Primary Examiner—William Briggs
Attorney, Agent, or Firm—Sughrue, Mion, Zinn, Macpeak & Seas

[57] ABSTRACT

The invention relates to a machine tool on which an extra working head can be exchanged readily. The machine tool comprises a main beam extending horizontally in leftward and rightward directions, a carrier mounted for leftward and rightward movement on the main beam, a ram mounted for upward and downward sliding movement on the carrier, at least one standing working head mounted for upward and downward movement on the carrier, a plurality of head holders, an extra working head held on each of the head holders, a sub beam extending in forward and backward directions and having a front portion and a rear portion defining therebetween a gap adjacent an end of the main beam, first guide means provided on the front and rear portions of the sub beam for guiding the head holders for the extra working heads in a forwardly and backwardly juxtaposed relationship for forward and backward sliding movement thereon, a carriage mounted on the sub beam for slidably moving the head holders along the first guide means, and second guide means provided on the ram for carrying a single head holder thereon.

3 Claims, 7 Drawing Sheets

MACHINE TOOL

BACKGROUND OF THE INVENTION

1. Field of the Invention

This invention relates to a machine tool, and more particularly to a numerically controlled wood working machine wherein several working heads such as a router head, a drill head, a grinder head and a planer head are selectively used for various working operations.

2. Description of the Prior Art

One of wood working apparatus of the type mentioned has been provided already by the inventor and is disclosed in Japanese Patent Publication No. 33281/1984. The apparatus includes a ram mounted for upward and downward sliding movement on a vertical rail provided on a front face of a center column. The ram is moved upwardly or downwardly by means of a screw shaft connected to be rotated by a motor. A pair of beams extend horizontally leftwardly and rightwardly from the opposite left and right sides of the center column. The beams are separated from each other on the opposite sides of the ram and define a fixed gap therebetween. Each of the beams has a pair of upper and lower horizontal rails provided in parallel to each other thereon while a pair of short upper and lower horizontal rails are provided on a front face of the ram such that, when the rails on the ram are positioned in level with the rails on the left and right beams, the rails on the left and right beams are connected to each other by way of the rails on the ram.

Five head holders are mounted for leftward and rightward sliding movement in a horizontal row on the upper and lower rails and individually extend in vertical directions. When the rails on the left and right beams are connected to each other by way of the rails on the ram, the head holders can move leftwardly and rightwardly between the left and right beams. Meanwhile, only one of the five head holders is permitted to be positioned on the ram in the gap between the left and right beams, and such head holder can be moved upwardly or downwardly by and together with the ram. A head base is mounted for adjusting movement in a vertical direction on a front face of each of the head holders, and one of such working heads as mentioned hereinabove can be selectively attached to the head base so that, when the head holder is moved upwardly or downwardly, the working head is moved upwardly or downwardly together with the head holder. Thus, a selected one of working heads is attached to each of the head bases on the head holders. The ram can thus removably carry a single working head thereon by way of a corresponding head holder. The ram has a connector by way of which power is supplied only to a working head carried on the ram then. Consequently, only a working head carried on the ram can be moved up and down together with the ram, and a motor for the working head is energized to drive the working head to perform a working operation.

A pair of left and right hydraulic cylinder devices are supported horizontally on the left and right beams, respectively. The hydraulic cylinder devices have piston rods which hold the five base holders therebetween and slidably move, when the hydraulic cylinder devices are energized suitably, the five base holders simultaneously in the leftward or rightward direction. In order to position a selected one of the five working heads in the gap between the left and right beams so that it may be carried on the ram, a plurality of stopping electromagnets are secured in a predetermined spaced relationship in the leftward and rightward directions on each of the left and right beams such that plungers thereof may stop sliding movement of the head holders. A similar stopping electromagnet is secured also to the ram.

The wood working apparatus, however, are disadvantageous in the following points.

In particular, depending upon contents of working operations, a particular one of working heads may be used very frequently while another particular working head is used seldom. However, when a working head which is used frequently is to be exchanged, also another working head which is used seldom must be moved leftwardly or rightwardly together with the former working head, which is inefficient and uneconomical and is not suitable for working for the production of many kinds of products by small amounts.

Further, when a working head is to be exchanged, all working heads must be moved simultaneously irrespective of a difference in frequency of use as described above. Since power required for such movement increases as the number of working heads increases, the number of working heads which can be used is limited naturally.

Besides, in order to allow selection of an arbitrary one of a plurality of working heads, two hydraulic cylinder devices and a large number of stopping electrodes are required. Accordingly, a comparatively great number of parts are required and the structure is complicated, which requires a correspondingly high production cost.

Further, when a plurality of head holders are to be slidably moved simultaneously, the head holders are held between piston rods of a pair of left and right hydraulic cylinder devices, and the hydraulic cylinder devices are alternatively rendered operative. Meanwhile, in order to position the working heads, stopping electromagnets are selectively energized or deenergized to stop sliding movement of the head holders by means of plungers thereof. Accordingly, control of a hydraulic pressure is difficult, and accurate positioning cannot be attained.

Moreover, since a plurality of head holders are contacted with each other and held between and moved by piston rods of a pair of left and right hydraulic cylinder devices, if it is intended to use a working head which has a greater width than a head holder, a spacer or spacers must be interposed between the head holder and an adjacent head holder or holders so that the head holders may not interfere with each other. Besides, the position or positions of a stopping electromagnet or electromagnets must be changed correspondingly, which is cumbersome.

In addition, if the number of head holders is changed, also specifications of hydraulic pressure control of hydraulic cylinder devices must be changed.

SUMMARY OF THE INVENTION

It is an object of the present invention to provide a machine tool wherein a working head can be exchanged readily and efficiently a comparatively low power.

It is another object of the present invention to provide a machine tool which is reduced in number of components and simplified on construction.

It is a further object of the present invention to provide a machine tool wherein head holders can be positioned accurately in an exchanging operation with a simplified construction.

In order to attain the objects, according to the present invention, a machine tool comprises a main beam extending horizontally in leftward and rightward directions, a carrier mounted for leftward and rightward movement on the main beam, a ram mounted for upward and downward sliding movement on the carrier, at least one standing working head mounted for upward and downward movement on the carrier, a plurality of head holders, an extra working head held on each of the head holders, a sub beam extending in forward and backward directions and having a front portion and a rear portion defining therebetween a gap adjacent an end of the main beam, first guide means provided on the front and rear portions of the sub beam for guiding the head holders for the extra working heads in a forwardly and backwardly juxtaposed relationship for forward and backward sliding movement thereon, a carriage mounted on the sub beam for slidably moving the head holders along the first guide means, and second guide means provided on the ram for carrying a single head holder thereon. With the machine tool, when the carrier is moved to the end of the main beam to align the second guide means on the ram with the first guide means in the gap and then the head holders for the extra working heads are slidably moved along the first guide means by the carriage, one of the head holders which has been carried on the second guide means is transferred to the first guide means while one of those of the head holders which have been carried on the first guide means is transferred to the second guide means.

Each of the head holders may have a first hook provided on one of front and rear sides thereof and a second inverted hook provided on the other side thereof in order to allow the head holder to be releaseably connected to an adjacent one of the head holders. If each adjacent ones of the head holders are connected to each other by engaging opposing ones of the first and second hooks of them with each other, then only if the head holder of an arbitrary one of the working heads is transferred from the first guide means on the sub beam to the second guide means on the ram and then the carrier is moved away from the end of the main beam, then the hooks of the head holder transferred to the ram are automatically disengaged from the corresponding hooks of those adjacent head holders remaining on the sub beam. On the other hand, if the carrier is moved to the end of the main beam to align the second guide means on the ram with the first guide means, then the hooks of the head holder currently carried on the second guide means on the ram are automatically engaged with the corresponding hooks of the adjacent head holders on the sub beam. Accordingly, only if an arbitrary one of the working heads to be subsequently used is moved in position into the gap of the sub beam, then an exchanging operation of a head holder is performed automatically.

The machine tool may include an automatic tool exchanging device which can automatically exchange a tool of the standing working head on the carrier. In particular, the standing working head on the carrier includes a chuck for removably holding a tool thereon, and an extra holder table is located adjacent the other end of the main beam remote from the sub beam and connected to be rotated by a motor. The extra tool table has a plurality of tool holders provided thereon in a predetermined spaced relationship in a direction of rotation thereof such that each of the tool holders may removably receive a tool therein. If the carrier is moved to the end of the main beam remote from the sub beam and then the extra tool table is rotated by the motor, then the tools received in the extra tool table can be successively and selectively positioned to an exchanging position at which an extra tool can be held by the chuck.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
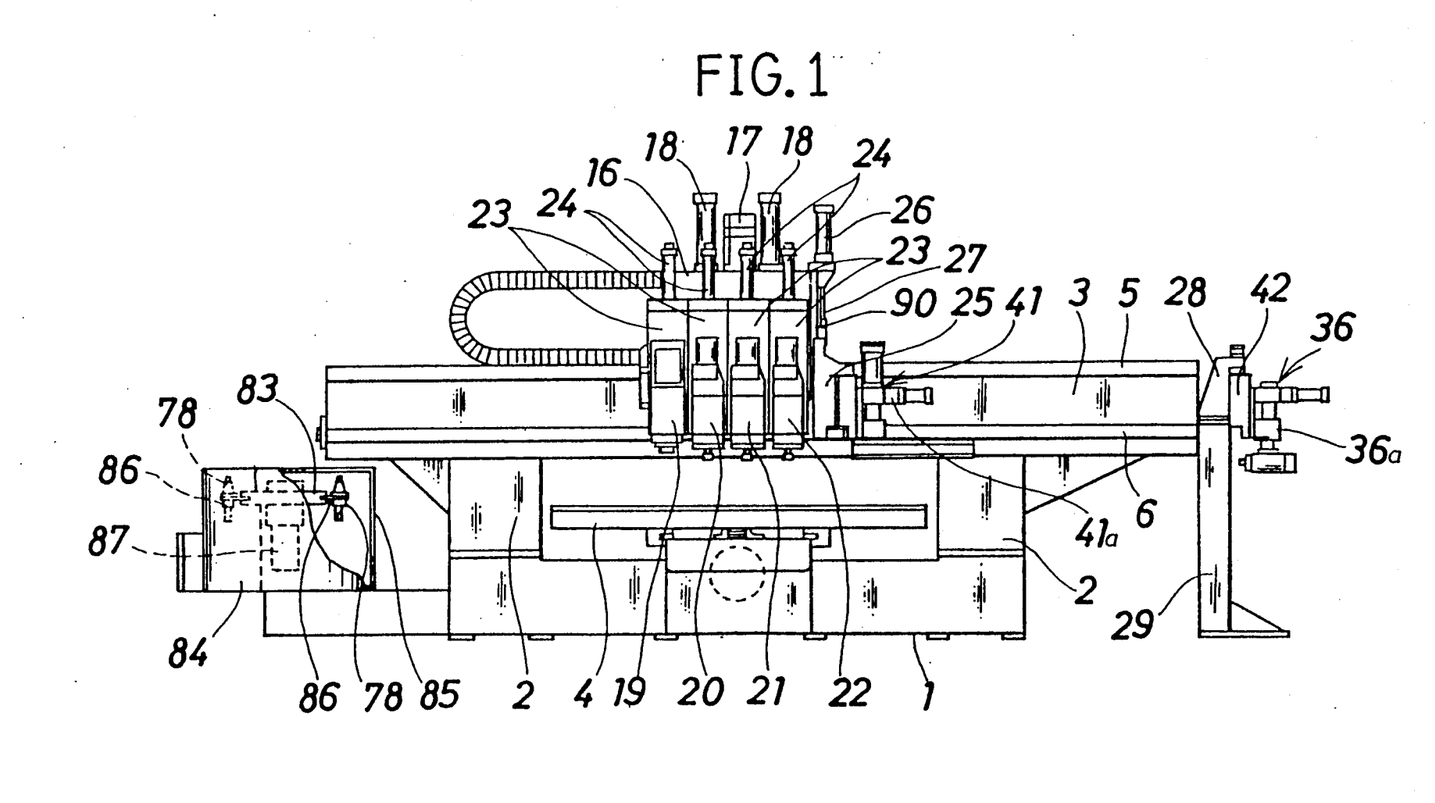
FIG. 1 is a front elevational view, partly broken, of an entire wood working machine to which the present invention is applied.
Figure 2:
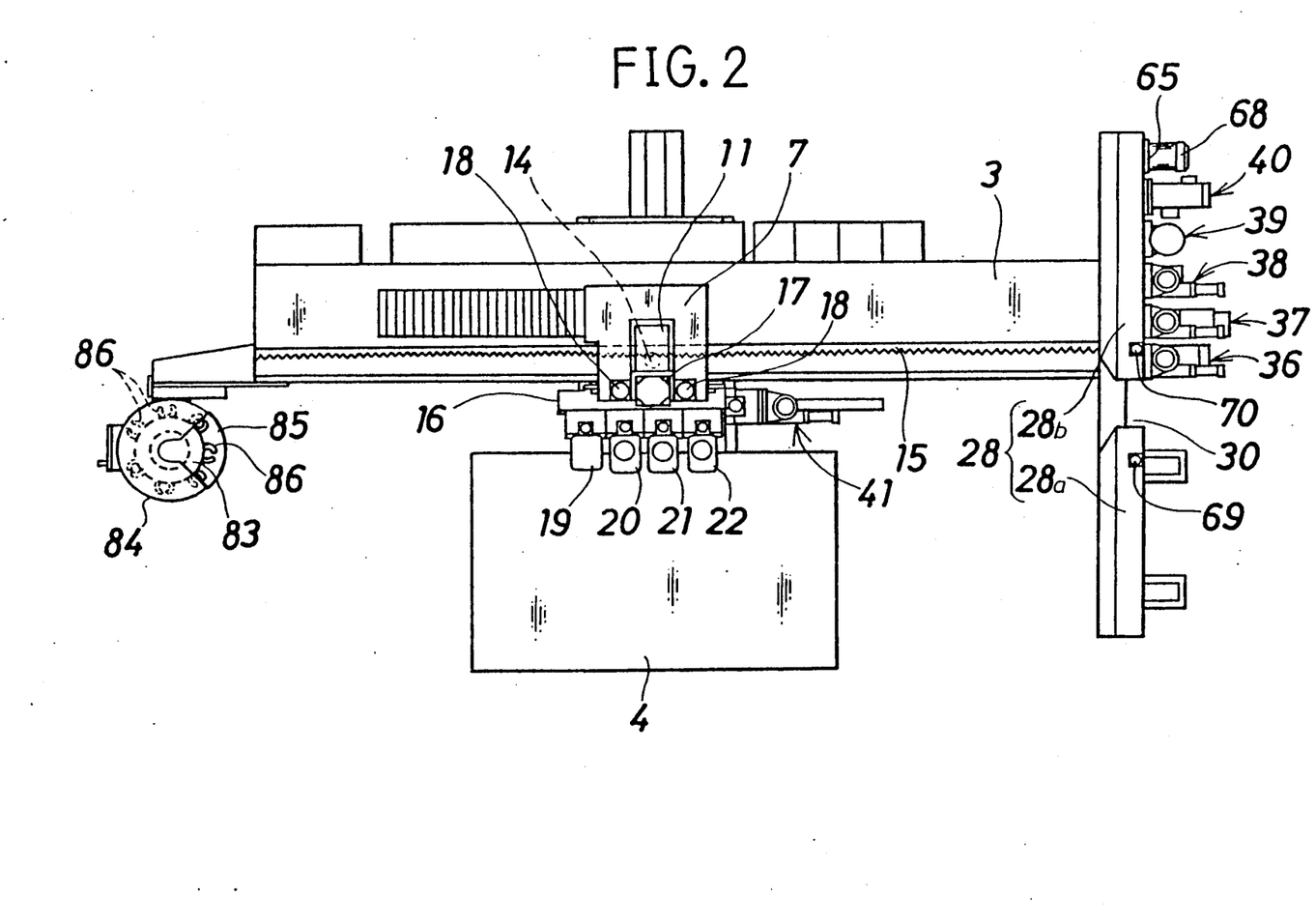
FIG. 2 is a plan view of the wood working machine of FIG. 1.

Referring first to FIGS. 1 and 2, there is shown an entire numerically controlled wood working machine to which the present invention is applied. The wood working machine shown includes a base 1 having a substantially T-shape in plan, and a pair of left and right columns 2 extending vertically upwardly from the opposite left and right ends of the base 1. A main beam 3 is supported at the top ends of the left and right columns 2 and extends horizontally in leftward and rightward directions. A table 4 for receiving thereon wood to be worked is mounted for forward and backward horizontal movement on a central portion of the base 1. A pair of upper and lower rails 5 and 6 are provided horizontally on the main beam 3, and a carrier 7 is mounted for leftward and rightward sliding movement in the following manner on the rails 5 and 6.

Figure 3:
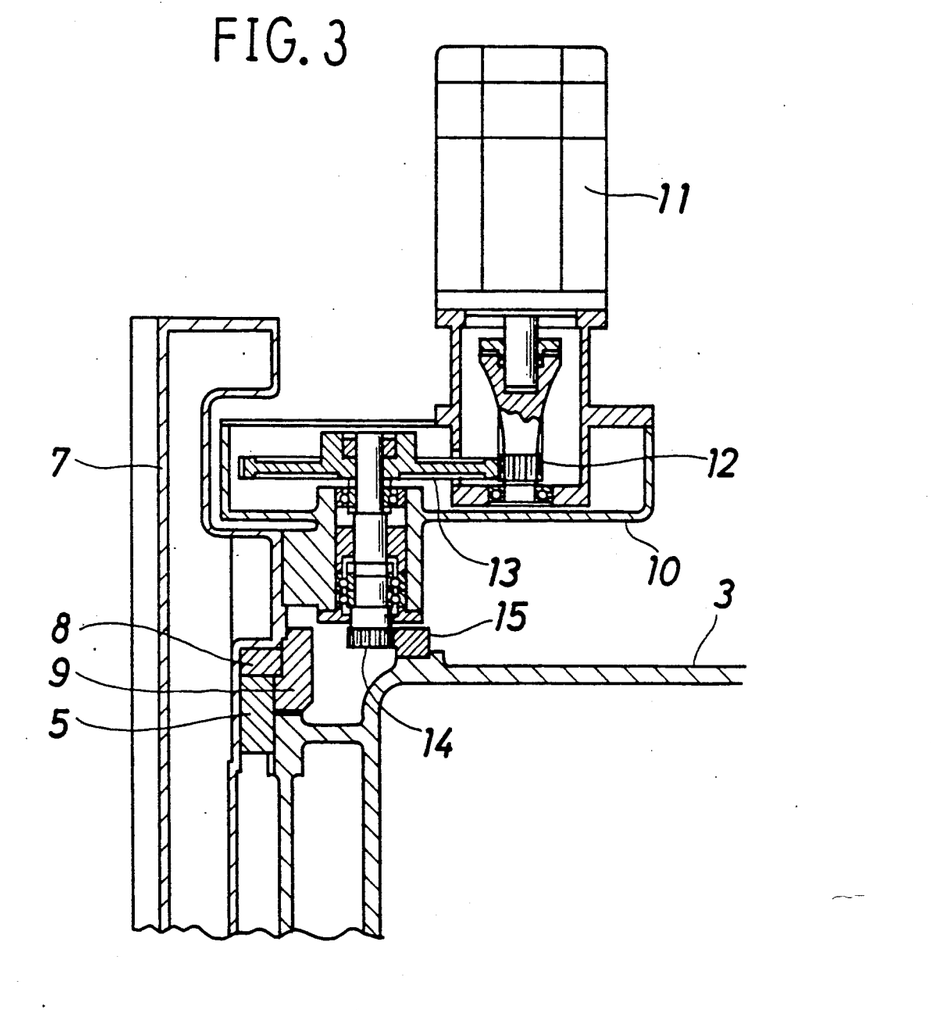
FIG. 3 is an enlarged sectional view showing a structure for mounting a carrier on a main beam.

Referring also to FIG. 3, a pair of slide plates 8 and 9 are securely mounted on the carrier 7 and held in engagement for sliding movement with the upper rail 5 while, though not shown, similar slide plates on the carrier 7 are held in engagement for sliding movement with the lower rail 6. A motor 11 for moving the carrier 7 is mounted on a gear box 10 mounted on an upper face of a rear portion of the carrier 7. Rotation of the motor 11 is transmitted to a pinion 14 outside the gear box 10 by way of a small gear 12 and a large gear 13 both in the gear box 10. The pinion 14 is held in meshing engagement with a rack 15 provided on an upper face of the main beam 3 so that the carrier 7 may be moved leftwardly or rightwardly along the rails 5 and 6 by forward or reverse rotation of the motor 11.

Referring back to FIGS. 1 and 2, a lift table 16 is mounted for upward and downward movement on a front face of the carrier 7 along a pair of vertical rails not shown. The lift table 16 is held in meshing engagement with a screw shaft not shown which is connected to be rotated by a lifting motor 17 carried on the carried 7 so that the lift table 7 may be moved upwardly or downwardly by the lifting motor 17. The weight applied to the lift table 16 is supported in equilibrium by a pair of left and right balancing pneumatic cylinders 18. A plurality of, for example, four, standing working heads 19 to 22 for different working operations are mounted in a juxtaposed relationship in leftward and rightward directions on a front face of the lift table 16. The working heads 19 to 22 are individually moved upwardly or downwardly by corresponding pneumatic cylinders 24 which are carried on corresponding head holders 23 mounted for upward and downward movement on the front face of the lift table 16. The leftmost working head 19 among the working heads 19 to 22 is constructed so as to allow automatic exchange of a tool while such exchange cannot be achieved with the other working heads 20 to 22. Therefore, tools which are used comparatively frequently are attached to the working heads 20 to 22.

A ram 25 on which an extra tool can be exchangeably carried is mounted for upward and downward sliding movement on a vertical rail 90 provided on a right end face of the lift table 16. The ram 25 is pin-connected to a piston rod 27 of a pneumatic cylinder 26 mounted on the lift table 16 so that it may be moved upwardly or downwardly by the pneumatic cylinder 26.

Figure 4:
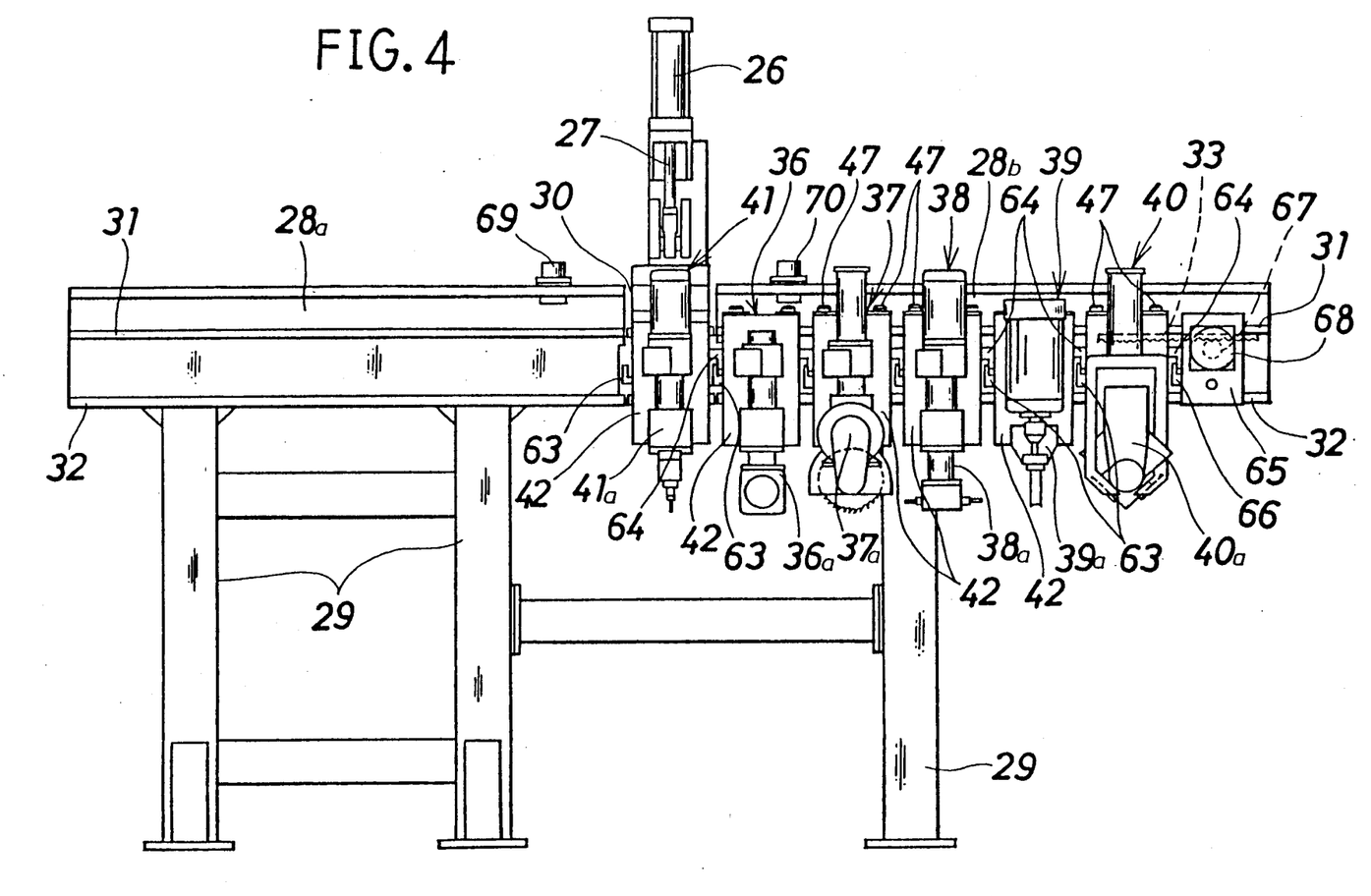
FIG. 4 is a side elevational view principally showing a sub beam on which extra working heads are held in a standby condition.

Referring also to FIG. 4, a sub beam 28 for holding a plurality of extra working heads in a standby condition thereon is provided at a position adjacent the right end of the main beam 3. The sub beam 28 is supported on a plurality of columns 29 and extends horizontally in forward and backward directions such that it may make the right angle with respect to the main beam 3. The sub beam 28 has a gap 30 defined therein adjacent the right end of the main beam 3. The sub beam 28 is thus divided into a front portion 28a and a rear portion 28b by the gap 30. The left-hand side opening of the gap 30 is expanded forwardly and rearwardly as seen in FIG. 2. As shown in FIG. 4, a pair of rails 31 and 32 are provided horizontally on a right-hand side face of the front portion 28a and a right-hand side face of the rear portion 28b of the sub beam 28 such that they are separated at the gap 30. Meanwhile, a rack 33 is provided along a lower edge of the upper rail 31 of the rear portion 28b of the sub beam 28.

Figure 5:
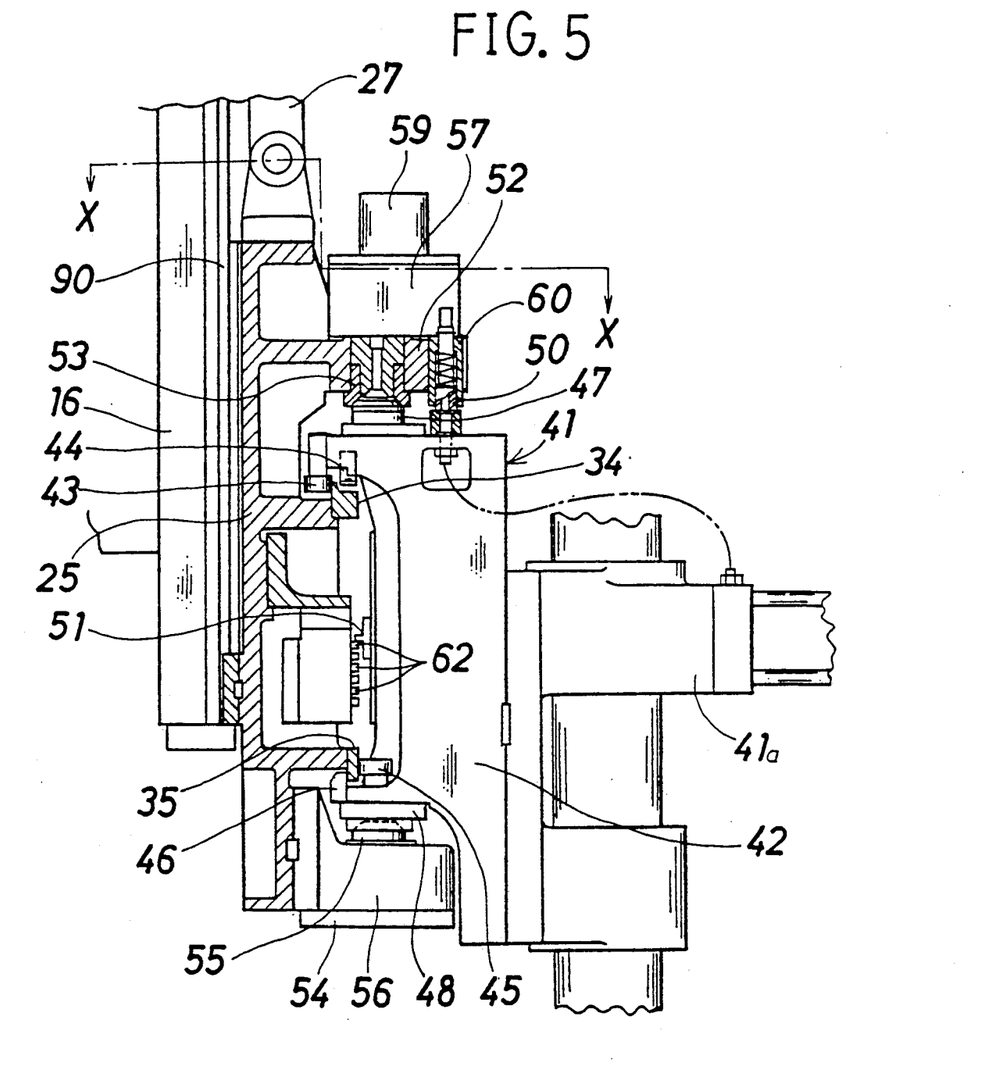
FIG. 5 is a sectional view showing an extra head unit carried on a ram mounted on a carrier.

Referring to FIG. 5, a pair of upper and lower rails 34 and 35 corresponding to the upper and lower rails 31 and 32 of the sub beam 28 are provided also on a right-hand side face of the ram 25. When the carrier 7 is moved to a right end position of the main beam 3 and the ram 25 is moved into the gap 30 of the sub beam 28, the rails 34 and 35 on the ram 25 are aligned with the upper and lower rails 31 and 32 on the sub beam 28, respectively.

A plurality of extra head units may be mounted in a juxtaposed relationship on the rails 31 and 32 on the sub beam 28 while a single extra head unit can be mounted on the rails 34 and 35 on the ram 25 such that it can be exchanged for one of the head units on the sub beam 28. In the arrangement shown in the drawings, up to five extra head units 36 to 40 are mounted on the rails 31 and 32 of the sub beam 28 while another head unit 41 is mounted on the upper and lower rails 34 and 35 of the ram 25 as seen from FIG. 4. The six head units 36 to 41 include different working heads 36a to 41a for different working operations carried on individual head holders 42 thereof, respectively. The head holder 42 have a same size and a common structure, and the head holder 42 of any one of the head units 36 to 41 can be moved in either direction into or out of the gap 30 of the sub beam 28.

Figure 6:
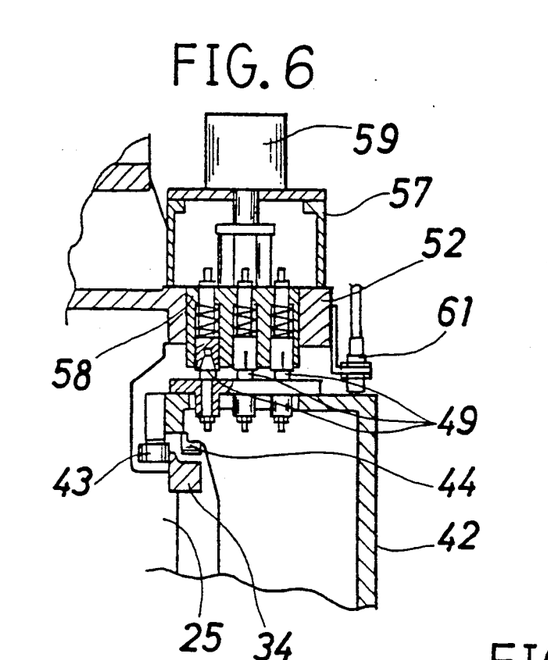
FIG. 6 is a sectional view of a connector between the ram and a head unit.
Figure 7:
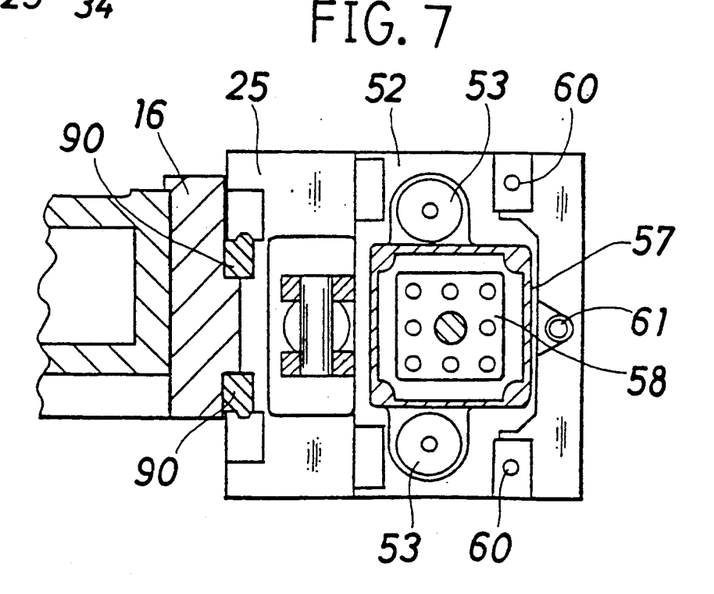
FIG. 7 is a sectional view taken along line X—X of FIG. 5.

Referring now to FIGS. 5 to 7, the head unit 41 is shown mounted on the ram 25. A pair of rollers 43 and 44 are provided on a rear face of the head holder 42 of the head unit 41 such that they may hold therebetween and be rolled along the upper rail 34 therebetween while another roller 45 and an engaging plate 46 are provided on the rear face of the head holder 42 such that they may hold therebetween and be rolled along the lower rail 35 so that the head holder 42 may be carried for sliding movement in the forward and backward directions on the upper and lower rails 34 and 35. The head holder 42 can be carried for sliding movement in the forward and backward directions similarly on the upper and lower rails 31 and 32. The head holders 42 of the other head units 36 to 40 can be carried in a similar manner on the rails 31 and 32 of the sub beam 28 and the rails 34 and 35 of the ram 25.

Each of the head holders 42 has a pair of projections 47 provided on an upper face thereof for positioning the head holder 42 with respect to the ram 25 while it has a cone 48 securely mounted at the center of a lower face thereof. Further, a plurality of plugs 49 are provided on the upper face of each of the head holders 42 as shown in FIG. 6 so as to allow supply of power to and control of the working head carried on the head holder 42, and a pair of male joints 50 for the supply and discharge of air are provided on the upper face of each of the head holders 42 as shown in FIG. 5. Meanwhile, a dog 51 for the distinction of the head unit from any other head unit is securely mounted on a rear face of each of the head holder 42. Such dogs 51 are provided at different vertical positions on the six head units in order to allow distinction among the six head units 36 to 41.

Meanwhile, a pair of cones 53 for fitting engagement with the projections 47 of a head holder 42 are provided on an upper bracket 52 of the ram 25 while a small pneumatic cylinder 56 is installed on a lower bracket 54 of the ram 25 such that an end portion of a piston rod 55 thereof may be fitted with the cone 48 of the ram 25. Further, a box-shaped base 57 is securely mounted on the upper bracket 52, and a small pneumatic cylinder 59 is provided on the box-shaped base 57 for moving sockets 58 for fitting engagement with the plugs 49 of a head holder 42 upwardly or downwardly. Futher, a pair of female joints 60 for fitting engagement with the male joints 50 on a head holder 42 are mounted for upward and downward movement on the upper bracket 52 and normally urged downwardly by suitable spring means. A sensor 61 for detecting completion of positioning of a head holder 42 is also mounted on the upper bracket 52. For example, six switches 62 are provided in a column at a central location of the ram 35 such that they may each be pushed to be turned on by the dog 51 on a head holder 42.

Now, if the holder 42, for example, of the head unit 41 is carried on the upper and lower rails 34 and 35 of the rum 25 as shown in FIG. 5, then that one of the switches 62 which opposes to the dog 51 is turned on. Consequently, it is detected that the head unit 41 has been mounted in position onto the ram 25. Then, the piston rod 55 of the pneumatic cylinder 56 is moved upwardly to fit the end portion thereof into the cone 48 to move up the head holder 42 a little until the projections 47 are fitted into the cones 53. As a result, the head holder 42 is positioned with respect to the ram 25 while being restricted from moving in any direction. This is detected by the sensor 61. Thereupon, also the male joints 50 for the supply and discharge of air are fitted into the female joints 60. After then, the sockets 58 are moved down into fitting engagement with the plugs 49 by the pneumatic cylinder 59, and consequently, power is supplied to the working head 41a while enabling electric control of the working head 41a.

Referring to FIG. 4, in order to connect the head holder 42 of the head units 36 to 41 in a juxtaposed relationship in the forward and backward directions on the sub beam 28, an L-shaped hook 63 is provided on a front end face of each of the head holders 42 while an inverted L-shaped hook 64 is provided on a rear end face of each head holder 42. Thus, each two adjacent ones of the head holders 42 are connected for integral forward and backward movement to each other such that the front hook 63 on the rear one of the head holders 42 is engaged with the rear hook 64 on the front head holder 42, but each of such two adjacent head holders 42 does not interfere with and hence allows leftward or rightward movement of the other head holder 42.

Accordingly, if the head unit 41 is moved into the gap 30 of the sub beam 28 as shown in FIG. 4 and carried onto the ram 25 as described above and then the carried 7 is moved leftwardly, then the head holder 42 on the head unit 41 can move away from the gap 30 irrespective of the head holders 42 of the other head units 36 to 40.

In order to allow the head holders 42 connected in a forwardly and backwardly juxtaposed relationship to each other in such a manner as described above to be slidably moved forwardly or backwardly at a time, a carriage 65 is mounted for forward and backward sliding movement on the upper and lower rails 31 and 32 of the rear portion 28b of the sub beam 28 similarly to the head holders 42. The carriage 65 is located rearwardly of the rearmost one of the head holders 42 on the sub beam 28. A hook 66 is provided also on a front end face of the carriage 65 so that the carriage 65 may be connected to the rearmost head holder 42. The carriage 65 has a pinion 67 provided thereon and held in meshing engagement with the rack 33 and further has a motor 68 mounted thereon for rotating the pinion 67. Thus, when the motor 68 rotates forwardly or reversely, the carriage 65 is moved forwardly or backwardly along the rails 31 and 32 to move the head units 36 to 40 connected to each other on the sub beam 28 forwardly or backwardly at a time. In this instance, if the head unit 41 is positioned in the gap 30 of the sub beam 28 as shown in FIG. 4 and is free from the restriction by the piston rod 55 of the pneumatic cylinder 56, then also the head unit 41 is moved forwardly or backwardly together with the head units 36 to 40. A pair of sensors 69 and 70 are mounted on the front portion 28a and the rear portion 28b, respectively, of the sub beam 28 such that each of them may detect a head holder 42 at a predetermined position near the gap 30.

Exchanging of one of the extra head units 36 to 41 on the ram 25 proceeds in the following manner.

In particular, the pneumatic cylinder 26 on the carrier 7 is first rendered operative to move the ram 25 until the upper and lower rails 34 and 35 on the ram 25 may be alined with the upper and lower rails 31 and 32, respectively, of the sub beam 28, and then the carrier 7 is moved to the right end position of the main beam 3 so that the head holder 42 of one of the head units 36 to 41 which is currently carried on the ram 25, that is, the head holder 42 of the head unit 41 in the example shown in FIG. 4, is positioned into the gap 30 of the sub beam 28 and the rails 34 and 35 on the ram 25 are alined with the rails 31 and 32, respectively, of the sub beam 28. Then, the head holder 42 is released from the restriction by the piston rod 55 of the pneumatic cylinder 56. Consequently, the hook 64 of the head unit 41 is engaged with the hook 63 of the head unit 36, in the example shown in FIG. 4, carried on the sub beam 28. After then, the carriage 65 is moved forwardly or backwardly. Consequently, the head holder 42 on the head unit 41 carried on the ram 25 is transferred from the rails 34 and 35 of the ram 25 to the rails 31 and 32 on the sub beam 28 so that it is slidably moved forwardly or backwardly together with the head holders 42 of the head units 36 to 40 which have been carried on the sub beam 28 till then. Then, when a selected one of the head units 36 to 40 which is to be used subsequently is positioned into the gap 30, the carriage 65 is stopped. As a result, the head holder 42 of the selected head unit is transferred from the rails 31 and 32 on the sub beam 28 to the rails 34 and 35 of the ram 25 and is now carried on the ram 25. Then, the pneumatic cylinder 56 is rendered operative to push up the head holder 42. Consequently, the head holder 42 is restricted from movement and positioned with respect to the ram 25. Then, it is detected by means of the switches 62 which one of the head units 36 to 41 has been carried onto the ram 25. After then, the carrier 7 is moved leftwardly. Thereupon, the head unit now carried on the ram 25 is moved out of the gap 30 and follows the carrier 7 together with the ram 25.

Subsequently, an automatic tool exchanging device for automatically exchanging a tool for the leftmost working head 19 provided standing on the carrier 7 will be described.

Figure 8:
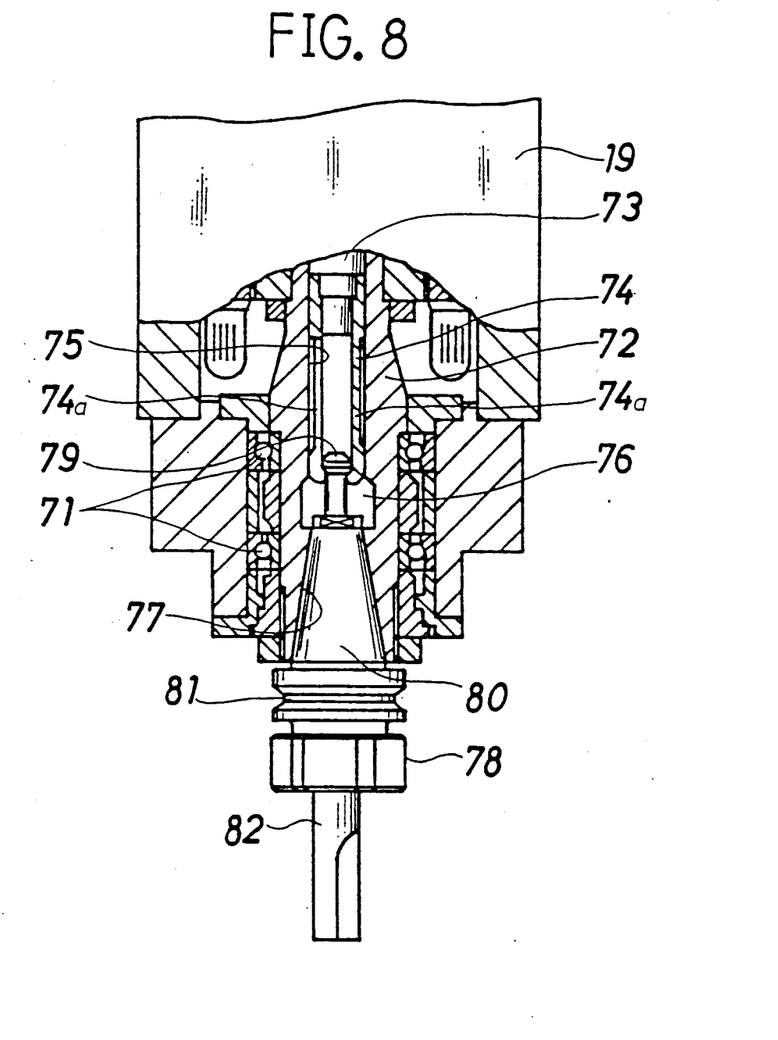
FIG. 8 is a sectional view of a chuck of a standing working head on the carrier and a tool caught by the chuck.

Referring now to FIG. 8, the working head 19 shown includes a hollow vertical spindle 72 accommodated in the inside thereof. The spindle 72 is supported at a lower end portion thereof for rotation by means of a pair of bearings 71. The spindle 72 is connected to be rotated by a motor not shown. A piston rod 73 of a pneumatic cylinder not shown and a chuck 74 attached to a lower end of the piston rod 73 are fitted for upward and downward sliding movement in the spindle 72. In particular, the chuck 74 is fitted in and guided by an axial hole portion 75 formed in the spindle 72, and a small chamber 76 having a diameter a little greater than the diameter of the axial hole portion 75 is formed contiguously below the axial hole portion 75. Further, a conically expanding tapered portion 77 is formed from the small chamber 76 to the lower end of the spindle 72. The chuck 74 includes a plurality of divided fingers 74a, and when it is moved up by the piston rod 73 until lower end portions of the fingers 74a thereof are moved from within the small chamber 76 into the axial hole portion 75, a pull stud 79 of a tool 78 is held by and among the lower end portions of the fingers 74a. Each of such tools 78 has a truncated conical portion 80 for fitting with the tapered portion 77 of the spindle 72, a fastening portion 81 and a bit 82. Since the tool 78 is pulled up simultaneously when the pull stud 79 thereof is caught by the chuck 74, the truncated conical portion 80 thereof is fitted closely in the tapered portion 77 of the spindle 72 and is held firmly at the lower end of the spindle 72.

Meanwhile, referring back to FIGS. 1 and 2, a circular extra tool table 83 for holding such tool 78 as shown in FIG. 8 and some other tools 78 thereon is supported for horizontal rotation in a circular housing 84 near the left end of the sub beam 3. While the tools 78 are different in profile of the bits 82 thereof, they each have such a pull stud 79, a truncated conical portion 80 and a fastening portion 81 as those shown in FIG. 8. The housing 84 is cut away at a portion of a top wall and a contiguous portion of a side wall at a right-hand side location thereof to thereby form an opening 85. The extra tool table 83 has a plurality of tool holders 86 provided in a predetermined spaced relationship in a circumferential direction in an outer circumferential portion thereof. Each of the tool holders 86 has such a shape as will allow the fastening portion 81 of a tool 78 to be removably received in a horizontal direction therein, such as, for example, a C-shape. The extra tool table 83 is connected to be rotated by a motor 87. Rotation of the motor 87 is suitably controlled by a means not shown so that the tools 78 held on the tool holder 86 may be successively and selectively positioned at an exchanging position at the center in the opening 85.

An exchanging operation of a tool 78 of the working head 19 will proceed in the following manner.

The extra tool table 83 is first rotated by the motor 87 to position an empty tool holder 86 to the exchanging position at the center of the opening 85 of the housing 84, and then the working head 19 is moved down to a predetermined vertical position together with the lift table 16 by the lifting motor 17, whereafter the carrier 7 is moved the left end of the main beam 3 so that the fastening portion 81 of a tool 78 currently carried on the spindle 72 of the working head 19 is fitted into the empty tool holder 86. In this condition, the piston rod 73 is moved down. Thereupon, the fingers 74a of the chuck 74 are opened or expanded outwardly to release the tool 78 from the spindle 72. Consequently, the tool 78 is carried now on the tool holder 86.

Subsequently, the working head 19 is moved up together with the lift table 16, and then the extra tool table 83 is rotated until another tool 78 which is to be used subsequently is positioned to the exchanging position, whereafter the working head 19 is moved down again together with the lift table 16. Consequently, the pull stud 79 of the tool 78 is admitted into the small chamber 76 of the spindle 72. Then, the piston rod 73 is moved up again. As a result, the pull stud 79 is held and pulled up by the chuck 74 and the tool 78 is carried at the lower end of the spindle 72. After then, the carrier 7 is moved rightwardly. Consequently, the tool 78 is removed from the tool holder 86.

Since the present wood working machine has such construction as described above, typical working operations which are performed comparatively frequently are performed with the working heads 20 to 22 provided standing on the carrier 7, but various drilling operations are performed with the working head 19 selectively exchanging the tools 78, and a special working operation can be performed with an arbitrarily selected one of the extra working heads 36 to 41. Accordingly, the present wood working machine is convenient for such working demands as to produce a large number of kinds of articles by small amounts.

It is to be noted that the present invention is not limited to such wood working machine as described hereinabove, but can be applied to various machine tools for the working of plastic or metal.

Having now fully described the invention, it will be apparent to one of ordinary skill in the art that many changes and modifications can be made thereto without departing from the spirit and scope of the invention as set forth herein.

What is claimed is:

1. A machine tool, comprising a main beam extending horizontally in leftward and rightward directions, a carrier mounted for leftward and rightward movement on said main beam, a ram mounted for upward and downward sliding movement on said carrier, at least one standing working head mounted for upward and downward movement on said carrier, a plurality of head holders, an extra working head held on each of said head holders, a sub beam extending in forward and backward directions and having a front portion and a rear portion defining therebetween a gap adjacent an end of said main beam, first guide means provided on said front and rear portions of said sub beam for guiding said head holders for the extra working heads in a forwardly and backwardly juxtaposed relationship for forward and backward sliding movement thereon, a carriage mounted on said sub beam for slidably moving said head holders along said first guide means, and second guide means provided on said ram for carrying a single head holder thereon, wherein, when said carrier is moved to said end of said main beam to align said second guide means on said ram with said first guide means in said gap and then said head holders for said extra working heads are slidably moved along said first guide means by said carriage, one of said head holders which has been carried on said second guide means is transferred to said first guide means while one of those of said head holders which have been carried on said first guide means is transferred to said second guide means.

2. A machine tool as claimed in claim 1, wherein each of said head holders has a first hook provided on one of front and rear sides thereof and a second inverted hook provided on the other side thereof in order to allow the head holder to be releaseably connected to an adjacent one of said head holders.

3. A machine tool as claimed in claim 1, wherein said standing working head on said carrier includes a chuck for removably holding a tool thereon, and an extra holder table is located adjacent the other end of said main beam remote from said sub beam and connected to be rotated by a motor, said extra tool table having a plurality of tool holders provided thereon in a predetermined spaced relationship in a direction of rotation thereof, each of said tool holders being adapted to removably receive a tool therein.

* * * * *